United States Patent [19]

Heikkinen

[11] Patent Number: 5,719,857
[45] Date of Patent: Feb. 17, 1998

[54] METHOD AND APPARATUS FOR IMPLEMENTING FREQUENCY-HOPPING IN A BASE STATION

[75] Inventor: Eero Heikkinen, Oulu, Finland

[73] Assignee: Nokia Telecommunications Oy, Espoo, Finland

[21] Appl. No.: 553,494

[22] PCT Filed: Mar. 16, 1995

[86] PCT No.: PCT/FI95/00142

§ 371 Date: Jan. 31, 1996

§ 102(e) Date: Jan. 31, 1996

[87] PCT Pub. No.: WO95/26040

PCT Pub. Date: Sep. 28, 1995

[30] Foreign Application Priority Data

Mar. 18, 1994 [FI] Finland ................... 941289

[51] Int. Cl.$^6$ ................................. H04J 3/12
[52] U.S. Cl. ............... 370/330; 370/339; 375/202; 375/267; 455/101
[58] Field of Search ................ 370/330, 339, 370/436, 458, 479, 478, 310, 315, 343, 345, 437, 465, 468, 522, 523, 524, 527, 528, 537; 375/202, 203, 201, 347, 267, 299, 260, 259; 455/59, 60, 62, 63, 101, 52.1, 52.2, 52.3, 65, 17, 15, 16

[56] References Cited

U.S. PATENT DOCUMENTS

| | | | |
|---|---|---|---|
| 5,111,454 | 5/1992 | Hung et al. | 370/95.3 |
| 5,381,443 | 1/1995 | Borth et al. | 375/202 |
| 5,455,962 | 10/1995 | Kotzin | 375/202 |
| 5,504,783 | 4/1996 | Tomisato | 375/267 |
| 5,542,107 | 7/1996 | Kay | 455/101 |
| 5,570,352 | 10/1996 | Poyhonen | 375/202 |

FOREIGN PATENT DOCUMENTS

| | | | |
|---|---|---|---|
| 0 286 614 | 10/1988 | European Pat. Off. | H04B 7/26 |
| 0 650 305 | 4/1995 | European Pat. Off. | H04Q 7/30 |
| 91/12681 | 8/1991 | WIPO | H04L 27/30 |
| 93/17507 | 9/1993 | WIPO | H04B 7/26 |
| 93/20625 | 10/1993 | WIPO | H04B 7/26 |
| 93/22849 | 11/1993 | WIPO | H04B 7/26 |

*Primary Examiner*—Wellington Chin
*Assistant Examiner*—Huy D. Vu
*Attorney, Agent, or Firm*—Cushman Darby & Cushman Intellectual Property Group of Pillsbury Madison & Sutro LLP

[57] ABSTRACT

For implementing frequency-hopping in a base station, of a digital cellular radio system a first signal modulated by a base band data signal and transmitted on a first carrier frequency. The signal is divided in the time domain into several time slots, of which one time slot transmits the common control channel of the base station equipment and the other time slots transmit information regarding different connections. For an economical implementation of frequency-hopping in a base station having one transceiver unit, the base station further transmits a second signal modulated by the same base band data signal, on a second carrier frequency. The second signal is divided in the time domain into several time slots, each of which transmits the same information as the first signal, except the time slot that transmits the common control channel of the base station equipment. The second carrier frequency (27) is changed time-slot-specifically so that its frequency is the same as, or different from, the first carrier frequency.

12 Claims, 3 Drawing Sheets

| | 0 | 1 | 2 | 3 | 4 | 5 | 6 | 7 |
|---|---|---|---|---|---|---|---|---|
| f1 | CCCH | B1 | C1 | C2 | C3 | B2 | C4 | B3 |

| | 0 | 1 | 2 | 3 | 4 | 5 | 6 | 7 |
|---|---|---|---|---|---|---|---|---|
| f2 | - | - | C1 | C2 | - | - | C4 | - |
| f3 | - | - | C1 | C2 | - | - | C4 | - |
| f4 | - | - | C1 | C2 | - | - | C4 | - |

METHOD AND APPARATUS FOR IMPLEMENTING FREQUENCY-HOPPING IN A BASE STATION

This application claims benefit of international application PCT/FI95/00142 filed Mar. 16, 1995.

BACKGROUND OF THE INVENTION

The present invention relates to a method for implementing frequency-hopping in a base station of a digital cellular radio system. In the base station, a first signal modulated by base band data signal is transmitted on a certain carrier frequency. The signal is divided in the time domain into several time slots of which one time slot transmits the common control channel of the base station equipment and the other time slots transmit information regarding different connections.

In cellular radio systems, the quality of a radio channel varies as a function of time and place. On many occasions, a transmitting antenna and a receiving antenna are not within sight of each other due to obstacles formed by terrain or buildings in the line of sight, and thus the signal detected at the receiver is a sum of beams that have travelled different paths and have been reflected from obstacles and that are, further, with different phases. The sum of several signals with different phases follows the Rayleigh distribution in cases of randomly distributed phases.

Signal fading is, furthermore, dependent on the frequency of the signal. Thus, if a frequency difference between two signals is great enough, their fadings do not correlate. A difference of 1 MHz, for example, is large enough for signal fadings to be independent of each other.

The frequency selective fading of a signal described above is one reason for the introduction of frequency-hopping technology in digital cellular radio networks. Frequency-hopping means that the transmission frequency used in a connection is changed at predetermined intervals. Due to frequency-hopping, the transmission quality can be improved especially in situations in which the terminal equipment moves very slowly, or not at all, as is often the case with, for example, hand-held phones.

Apart from the frequency diversity achieved by frequency-hopping, the method is also advantageous in distributing the interferece caused by the radio connection onto several frequencies, in which case momentary interference on any one frequency will remain small.

In the prior art solutions, if frequency-hopping has been desired in a cell served by a base station, the base station equipment must have been provided with at least two complete transceiver units which contain base band sections and radio frequency sections. Each unit, as such can form an independent base station, but to implement frequency-hopping several complete transceiver units have been required in the same cell. This has resulted in that the base station equipment capable of frequency-hopping has been disproportionately large in small cells in comparison with the capacity needed, and the implementation of frequency-hopping has thus required heavy investments.

SUMMARY OF THE INVENTION

It is thus an object of the present invention to implement frequency-hopping in a base station equipment economically and without creating excessive capacity.

This is achieved with the method of the type set forth in the introduction, which is characterized in that the base station further transmits a second signal modulated by the same base band data signal on a certain carrier frequency, which second signal is divided in the time domain into several time slots, each of which transmits the same information as the first signal, except the time slot which transmits the common control channel of the base band equipment, and which carrier frequency is changed time-slot-specifically so that the frequency is either the same, as, or different from, the carrier frequency.

The invention also relates to a base station equipment in a digital cellular radio system, this equipment comprising means for generating a base band data signal, a first means for transmitting a signal modulated by a certain carrier frequency, and this signal being divided in the time domain into several time slots of which one transmits the common control channel (CCCH) of the base station equipment and the others which transmit information regarding different connections, and an antenna, characterized in that the equipment further comprises a second means for transmitting a signal modulated by a carrier frequency, elements for changing the carrier frequency used in the second means time-slot-specifically, and means for distributing the base band signal to the first and the second transmitting means so that the signal transmitted by the second means is divided in the time domain into several time slots of which each transmits the same information as the signal transmitted by the first means except the time slot that transmits the common control channel (CCCH) of the base station equipment.

The method of the invention can be applied for implementing frequency-hopping in a cell comprising one transceiver unit. The base station in accordance with the invention can be built similarly to a conventional frequency non-hopping base station, the only necessary changes being in the RF section of the transmitter. Only one base band section is needed. If frequency-hopping is unnecessary, the base station of the invention can easily implement space diversity in a direction from the base station to the mobile station. The use of frequencies can be optimized so that frequency-hopping is utilized only on weak connections.

BRIEF DESCRIPTION OF THE DRAWINGS

In the following, the invention will be described in greater detail with reference to the examples in accordance with the accompanying drawings, in which.

DETAILED DESCRIPTION

The invention can thus be applied in the base station equipment of digital cellular radio systems such as the GSM system, for instance. In the following, the invention will be described when applied in a time slot structure of the type used in the GSM system, but without being restricted to that.

Figures 1, 4A, 4B:
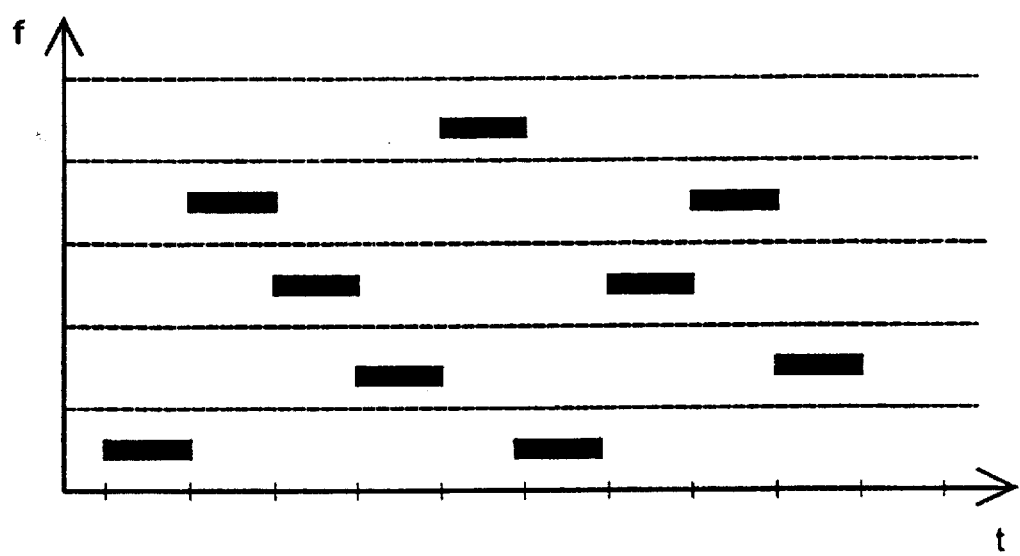
FIG. 1 illustrates time-slot-specific frequency-hopping.

FIG. 1 illustrates the implementation of time-slot-specific frequency-hopping. The horizontal axis of the figure represents time, and the vertical axis represents frequency. The figure shows the frequency changes of one channel according to time slots. The base station changes carrier frequency at the beginning of every time slot, but the frequency is not changed during the time slot. The frequency is changed according to a predetermined sequence, in which case the receiver can monitor the hopping and receive the information contained in each time slot on a correct frequency. In a base station, each connection can have a hop sequence of its own, in which case the frequencies used in the time slots do not overlap.

Figure 2:
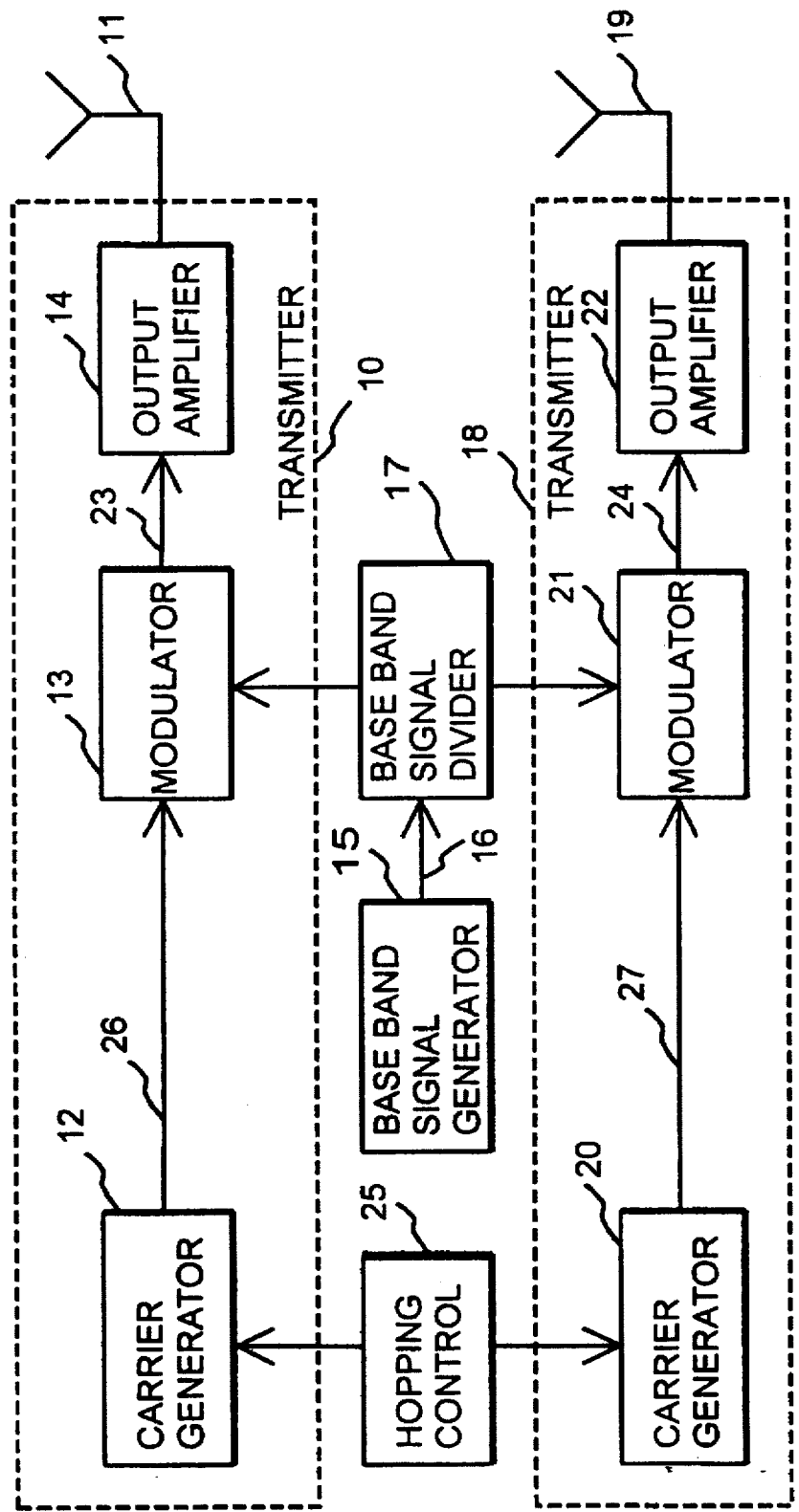
FIG. 2 shows an example of the structure of a base station equipment in accordance with the invention.

FIG. 2 is a block diagram of the structure of a base station equipment in which the method of the invention is applied. The equipment contains means 15 for generating a base band signal. The output 16 of the base band signal-generating means 15 is connected to two transmitter units 10,18 with the aid of a base band signal divider. The first transmitter unit 10 contains a carrier generator whose output 26 is connected to a modulating means 13 whose second input is a base band data signal from the base band signal divider 17. The time division carrier signal 23 modulated by a base band signal is fed via an output amplifier 14 to an antenna 11. The first signal of the transmitter unit contains the common control channel CCCH of a cell served by a base station. By listening to that signal, mobile stations obtain information of the base station so that they can contact it, if necessary. In a GSM system, traffic on the CCCH channel is transmitted in the first time slot of a frame, indicated by the number 0. The other time slots, of which there are seven in a GSM system, transmit a signal that is either data belonging to a connection or, if the time slot is not in use, is a dummy burst. FIG. 4a illustrates the structure of a GSM frame in which the first time slot 0 contains the CCCH channel, the second time slot 1 a dummy burst, time slots 2, 3, 4 and 6 data information, and time slots 5 and 7 each a dummy burst. The carrier frequency of the transmitter 10 is marked with f1, and it is constant.

The second transmitter unit 18 correspondingly contains a carrier-generator 20 whose output 27 is connected to modulation means 21 whose second input is the base band data signal from the base band signal divider 17, i.e. the same signal as in the input of the first transmitter unit. In the example of the figure, the time division carrier signal 24 modulated by the base band signal is supplied via output amplifier 22 to an antenna 19. The signal of the second transmitter unit does not contain the common control channel CCCH, and the time slot is not transmitted. In the other time slots 1–7, data belonging to some connection is transmitted, or the transmitter is switched off, if the time slot is not in use.

The carrier frequency used by the second transmitter unit hops time-slot-specifically under the control of the means 25, so that with each connection (i.e. time slot) the frequency changes according to a predetermined sequence. In a base station in accordance with FIG. 2, in which two antennas are in use, the carrier frequency of the second transmitter unit can momentarily be the same as the frequency f1 used by the first transmitter unit.

According to a second embodiment, when both of the transmitter units are on the same frequency, the second transmitter unit is switched off to avoid simultaneous transmission.

The second transmitter unit can be controlled time-slot-specifically so that frequency-hopping is only performed in certain time slots. If two antennas are in use in connections not applying frequency-hopping, both transmitters transmit the same signal on the same frequency, and space diversity is obtained.

Frequency use can be optimized so that frequency-hopping is only applied to poor quality connections. To judge communication quality, signal strength as well as bit error and signal-to-noise ratios can be used as standards.

Figure 3:
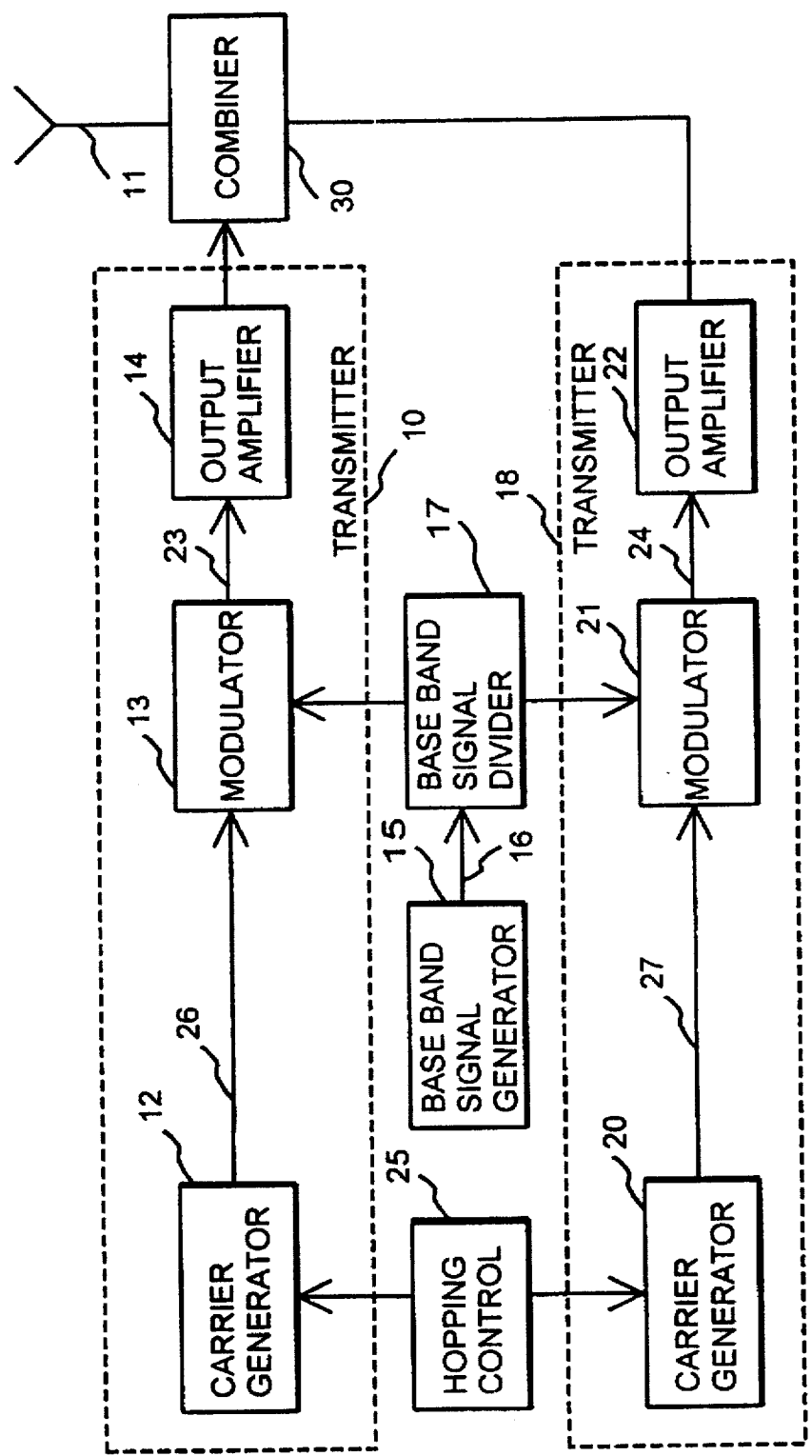
FIG. 3 shows another example of the structure of a base station equipment in accordance with the invention, and FIGS. 4a–4b describe the time slot construction of the output signal of the transmitting means.

FIG. 3 is a block diagram representation of an alternative structure of a base station equipment for implementing the method of the invention. The equipment contains means 30 for combining signals from two transmitter units 10, 18 for transmitting via one antenna 11. The operation of a base station such as the one in FIG. 3 is similar to the described above, except that when one antenna is used, the second transmitter unit is switched off in cases where its carrier frequency is the same as the frequency of the first transmitter unit.

In addition to the components described above, the exemplary base stations also contain components other than those described, such as filters and divider amplifiers, but due to reasons of clarity they have been omitted from the figure, as they are not essential to understanding the present invention.

As explained above, FIG. 4a illustrates a frame structure transmitted by the first transmitter unit, the first time slot 0 containing the CCCH channel, time slots 2, 3, 4 and 6 containing data information (C1–C4), and time slots 1, 5 and 7 containing a dummy burst (B1–B3). The carrier frequency of the first transmitter is indicated by f1, and it is constant.

FIG. 4b illustrates a frame structure transmitted by the second transmitter unit. In the example illustrated in the figure, the transmitter unit utilizes three different frequencies, f2, f3 and f4 in frequency-hopping. The number of frequencies can, of course, be something else in practice. Let us assume that connections C1, C2 and C4 using time slots 2, 3 and 6 employ frequency-hopping, but Connection C3 using time slot 4 does not hop. In such a case the second transmitter unit transmits a signal in time slots 2, 3 and 6 as shown by the figure, using at each moment of time one of the carrier frequencies f2–f4. The second transmitter unit can, depending on the application, also use the frequency f1 of the first transmitter unit. The frequency used at each connection and each moment of time depends on the chosen hopping sequence which is specific for each connection.

The second transmitter unit can, for example, transmit a frame in accordance with FIG. 4b so that time slot 2 uses frequency f2, time slot 3 frequency f3 and time slot 6 frequency f4. In the next frame, the time slots are changed so that time slot 2 uses frequency f3, time slot 3 frequency f4 and time slot 6 frequency f3. The frequencies of the time slots are independent of each other, and they can also be the same.

When two separate antennas are used, the second transmitter unit is able to transmit on non-hopping connections the time slot in question on the same frequency as the first transmitter unit, in which case space diversity is achieved at the transmitting end. In the example described above, the second transmitter unit can thus transmit the signal of connection C4 in time slot 6 on a frequency f1.

Even when using two separate antennas the second transmitter unit can be switched off if the frequencies of the transmitter units are the same; this can de done to avoid simultaneous transmission.

Even though the invention has been described in the above with reference to the examples in accordance with the accompanying drawings, it is obvious that the invention is not restricted to them but can be modified in a variety of ways within the scope of the inventive idea disclosed in the attached claims.

I claim:

1. A base station equipment in a digital cellular radio system, said equipment comprising:
  means for generating a base band data signal;
  a first means for transmitting a signal modulated by a first carrier frequency, said signal being divided in the time domain into several time slots of which one transmits a common control channel of the base station equipment and the other time slots transmit information regarding different connections;

an antenna;

a second means for transmitting a signal modulated by a second carrier frequency;

elements for changing said second carrier frequency time-slot-specifically; and means for distributing said base band signal to the first and the second transmitting means so that the signal transmitted by said second means is divided in the time domain into several time slots of which each transmits the same information as the signal transmitted by said first means, except said time slot that transmits the common control channel of the base station equipment.

2. The equipment as claimed in claim 1, wherein said first and the second means each comprise:

means for generating a carrier wave;

means for modulating the carrier wave by a base band signal; and means for amplifying the modulated signal.

3. The equipment as claimed in claim 1, further comprising:

an amplifier means; and a second antenna which is connected to said amplifier means.

4. The equipment as claimed in claim 1 further comprising:

means for combining said signals from said first and second transmitting means, for transmission via said antenna.

5. The equipment as claimed in claim 1 wherein:

said elements for changing the second carrier frequency are arranged to change the second carrier frequency according to a predetermined sequence.

6. The equipment as claimed in claim 5, for changing the second carrier frequency are arranged to switch off said second means when the frequency indicated by said predetermined sequence is the same as the frequency used by said first means.

7. A method for implementing frequency-hopping in a base station equipment of a digital cellular radio system, comprising:

transmitting by said base station a first signal modulated by a base band data signal, on a first carrier frequency, which signal is divided in the time domain into several time slots of which one time slot transmits a common control channel of the base station equipment and the other time slots transmit information regarding different connections;

further transmitting by said base station a second signal modulated by the same base band data signal, on a second carrier frequency, which second signal is divided in the time domain into several time slots each of which transmits the same information as said first signal, except said time slot which transmits the common control channel of the base station equipment, and which second carrier frequency is changed time-slot-specifically so that the frequency thereof is either the same as, or different from, said first carrier frequency.

8. The method as claimed in claim 7, wherein:

said second carrier frequency is changed time-slot-specifically according to a predetermined sequence.

9. The method as claimed in claim 7, wherein:

both said first and the second signals are transmitted via respective antennas.

10. The method as claimed in claim 7, wherein:

both said first and the second signals are transmitted via a same antenna.

11. The method as claimed in claim 8, wherein:

if said second carrier frequency, as indicated by said predetermined sequence to be used by said second signal is the same in each time slot as said first carrier frequency to be used by said first signal, said second signal is not transmitted.

12. The method as claimed in claim 7, wherein;

said second signal is transmitted time-slot-specifically when signal quality of signaling send from said base station in a respective time slot, as detected at a receiving end, is poorer than a predetermined threshold value.

* * * * *